April 3, 1956 R. G. COUNIHAN ET AL 2,740,949

MULTIDIMENSIONAL MAGNETIC MEMORY SYSTEMS

Filed Aug. 25, 1953 4 Sheets-Sheet 1

INVENTORS: RICHARD G. COUNIHAN
MUNRO K. HAYNES
GORDON E. WHITNEY

BY

JOHN ALDEN HALL
ATTORNEY

INVENTORS: RICHARD G. COUNIHAN
MUNRO K. HAYNES
GORDON E. WHITNEY

JOHN ALDEN HALL
ATTORNEY

INVENTORS: RICHARD G. COUNIHAN
MUNRO K. HAYNES
GORDON E. WHITNEY

BY

JOHN ALDEN HALL
ATTORNEY

MULTIDIMENSIONAL MAGNETIC MEMORY SYSTEMS

Filed Aug. 25, 1953 4 Sheets-Sheet 4

INVENTORS: RICHARD G. COUNIHAN
MUNRO K. HAYNES
GORDON E. WHITNEY

JOHN ALDEN HALL
ATTORNEY

United States Patent Office 2,740,949

Patented Apr. 3, 1956

2,740,949

MULTIDIMENSIONAL MAGNETIC MEMORY SYSTEMS

Richard George Counihan, Munro King Haynes, and Gordon Earle Whitney, Poughkeepsie, N. Y., assignors to International Business Machines Corporation, New York, N. Y., a corporation of New York Application August 25, 1953, Serial No. 376,492

2 Claims. (Cl. 340—174)

This invention relates to magnetic storage systems and particularly to means for electrically receiving and magnetically registering and for electrically transmitting coded information.

An essential component of large scale digital computers is a memory device or a registering means for receiving information in the form of "words" each consisting of a plurality of "bits," often expressed in binary notation, and for storing this information over indefinite periods coupled with the facility for giving up this information on demand. One form of such a memory device, particularly characterized by high speed secured by a marked high ratio of energization is disclosed in application Serial Number 376,300, filed on even date herewith in the name of Munro K. Haynes and this disclosure is incorporated herein and made a part hereof by this reference.

The object of the present invention is simplicity and economy secured mainly by means for switching external to the matrix of word lines or registers.

The making of a connection to any particular one of a great plurality of registers or word lines is a switching problem which under conventional arrangements requires a great amount of apparatus. The present invention provides a simple and economical means in the form of non-linear matrix address selectors denominated by geometrical analogy as multidimensional systems.

The switching means employed in the said copending application of Haynes is what may be termed a three dimensional system, one in which an approach to a word line or register is made in two directions, one to reach one end of a word line, a second to reach the other end of a word line, and in a third direction to selectively control the bits of the selected word line.

Where, by way of example, an array of 4096 word lines are to be included in a matrix, this means that there must be 64 matrix connections for one end of the word lines and another 64 matrix connections for the other ends thereof so that the selecting means must include a pair of switching means each capable of making a selection of one out of sixty-four. The number 4096, equal to 2 to the twelfth power, is chosen since any one word line thereof may be identified by the binary characterization of 12 address bits divided into four groups of three or divided into two groups of six.

Applicants have found that by a unique arrangement of non-linear matrix means external to the matrix of word lines or registers a great saving of apparatus for selecting purposes may be made. It has been determined that as a general proposition the amount of apparatus necessary for switching is inversely proportional to the number of switching units employed. Several forms of switching arrangements going beyond the conventional three dimensional arrays are disclosed herein in each of which it may be noted that as the number of dimensions increases the amount of apparatus decreases, leading to the unique result that it becomes more economical to use a larger number of smaller switching devices.

Where, by way of example, a so-called five dimensional system is contrasted with a conventional three dimensional system, the address selectors consist of four devices each capable of making a selection of one out of eight, whereas two selectors each capable of making a selection of one out of sixty-four had been previously required. Using the geometrical analogy two of these four selectors may be employed to select all the word lines in a first (X) plane and the other two used to select all the word lines in a second (Y) plane whereby the one word line common to these two planes becomes the single word line effectively selected.

Since three places suffice to express eight different numbers in binary notation, the address of any one of 4096 registers or word lines in this five dimensional system consists of four three place numbers, making up four of the five dimensions, the fifth being that assigned to the word bit selector.

In accordance with the present invention, then, means is provided to make a first matrix selection of a first plurality of word lines or registers including a desired one and concurrently to make a second matrix selection of a second plurality of word lines or registers including the said desired one, this said desired one being the only one common to the said selected pluralities.

A feature of the invention is a matrix array having connected between each first direction matrix connection and each second direction matrix connection a plurality of circuits each circuit including the connections for controlling a plurality of bistable magnetic elements. By coincidentally selecting one of said first direction connections and one of said second direction connections a group or plurality of word lines including a desired one may be selected and a signal passed therethrough. By coincidentally making a similar selection in another matrix of another group or plurality of word lines including the desired one and passing a signal therethrough, the coincident passage of said two signals through the said desired one effectively selects this one, and not any of the others having but a single signal passing therethrough. Thereupon the various bit elements may be selectively controlled by supplying inhibiting signals to the particular bits desired to be left each in its normal (binary 0) state and by supplying no bit signal to the particular bits desired to be changed each to its other (binary 1) state. Since all corresponding bit elements of both these selected plurality of word lines are connected together only an inhibiting signal may be used in the bit circuit to avoid an algebraic sum of signals in word lines other than the said selected one great enough to cause a change of state therein.

Another feature of the invention is the use of the algebraic sum of two coincidentally transmitted signals for extracting information from a given one of a plurality of double matrix connected registers. Where a unique word line must be selected by the selection of a plurality of unique word line circuits no current great enough in itself to cause a change of state in the cores interlinked therewith may be passed through any one word line circuit and the change of state in either direction must be brought about by the linear addition of forces from the several word line circuits combined only in the unique word line.

Other features will appear hereinafter.

The drawings consist of four sheets having seven figures, as follows.

Figures 1, 2:
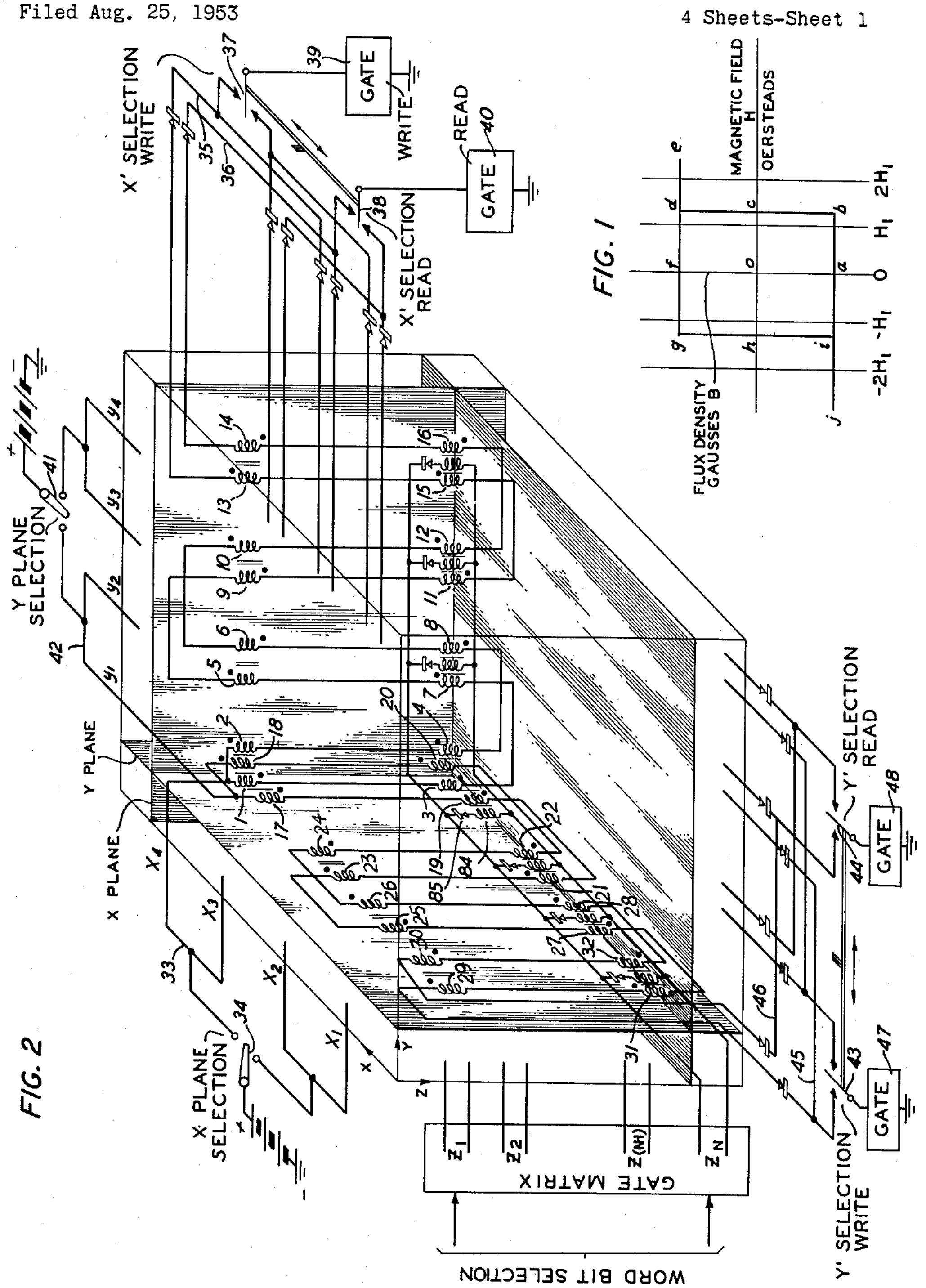
Fig. 1 is an idealized hysteresis loop of the magnetic material employed for the purposes of the present invention.
Fig. 2 is a schematic circuit diagram laid out in isometric projection to depict the geometrical allusions used as a convenient means for describing the circuits, and showing the essential connections of a five dimensional system.

This invention comprehends the use of a huge array of bistable magnetic cores arranged in a plurality of word lines each having a plurality of bits, a magnetic core being provided for each word bit. The outstanding property of the magnetic core is its markedly rectangular hysteresis loop, ideally depicted in Fig. 1. The material has two points of remanence, *a* and *f*. If the material is in the state *a* then the application of a magnetomotive force to drive it in the direction *j* to saturation will not result in a change in state for when this force is removed the material will return to the point *a* where the field strength is substantially that of saturation. If a magnetomotive force in the other direction is applied, say of a magnitude of $+H_1$, which will not drive the material to and beyond the knee of the hysteresis curve, then again no change of state will be brought about for on relaxation of this force the material will return to its point of remanence *a*. If, however, a greater force is applied so that the knee of the curve is reached and passed, say by a force of $+2H_1$, then the negative field will collapse and a positive field will be built up. The curve *abcde* will be traced and upon relaxation of the force the material will move to the point of remanence *f*. From this point it may be driven in like manner to the other point of remanence *a* by the application of a sufficiently great force, say $-2H_1$. It is to be particularly noted that an insufficient force, say $-H_1$, may be repeatedly applied without affecting the stable state represented by the point *f* (or the point *a*).

For purposes of registering information, the two states may arbitrarily be designated binary 0 (state *a*) and binary 1 (state *f*).

The advantages of such bistable magnetic cores are known and include the ability to maintain one of two stable states indefinitely without the expenditure of power, without the dissipation of heat, what is believed to be an essentially infinite life, and rugged construction and small size whereby a great number may be compacted into closely stacked arrays. They are static and noiseless and their operation from one state to another may be accomplished in an extraordinarily short time interval.

Where a great number of these magnetic cores are used in a memory organ it is convenient to speak of them as being connected and arranged in certain geometrical arrays. Again the form of the cores may vary from closed path cores of arbitrary shape having windings wound thereon to rings having toroidal coils or even rings having straight line wires passing therethrough. The present invention contemplates the use of these cores in any conventional form.

In accordance with the present invention a register or word line consists of a series of cores corresponding in number to the number of bits in the word to be registered. By way of example, a conveniently arranged memory organ may have some 4096 word lines each having 40 word bits. All the word lines in a given plane are connected in the same circuit so that each word line consists of cores having coils lying in the intersection of two planes. It may be said that a given word line may be selected through the selection of two planes, actually the selection of two series of unique connections in two separate matrices, each spoken of as a word line circuit, having within such unique connections a single common word line. This may be seen graphically depicted in Fig. 2. The coils 1, 2, 3 and 4 represent coils on the cores of a single word line, the coils 5, 6, 7 and 8, the coils on the cores of another word line, the coils 9, 10, 11 and 12, the coils on the cores of a third word line and the coils 13, 14, 15 and 16, the coils on the cores of a fourth word line. These various word line groups of coils are said to be in one plane. In like manner the coils 17 and 18 to 31 and 32 represent coils on the cores of a word line circuit consisting of a series of word lines in another plane at right angles to the first. The word line represented by the first bit coils 1, 2, 17 and 18 and by the *n*th bit coils 3, 4, 19 and 20 thus constitute a single word line defined by the selection of the first plane containing coils 1 to 16 and the second plane containing coils 17 to 32 inclusive.

The manner of the selection of these planes is roughly indicated in Fig. 2 where the switch 34 may be moved to connect to the matrix wire 33 and the switches 37 and 38 may be moved to connect to the (parallel) matrix wires 35 and 36. If it is assumed that the write gate 39 is enabled then a circuit will be completed for the coils 1, 3, 5, 7, 9, 11, 13 and 15. Coincidentally the switch 41 may be moved to connect to the matrix wire 42 and the switches 43 and 44 moved to connect to the matrix wires 45 and 46 respectively so if the write gate 47 is enabled a circuit will be completed for the coils 17, 19, 21, 23, 25, 27, 29 and 31. If each of these connections supplies an energization of $+H_1$ to its coils, then the cores having coils 1 and 17, and 3 and 19 will have a total energization of $+2H_1$. The other cores, such as those having coils 5 and 31 will have a total energization of $+H_1$.

Figures 3, 4:
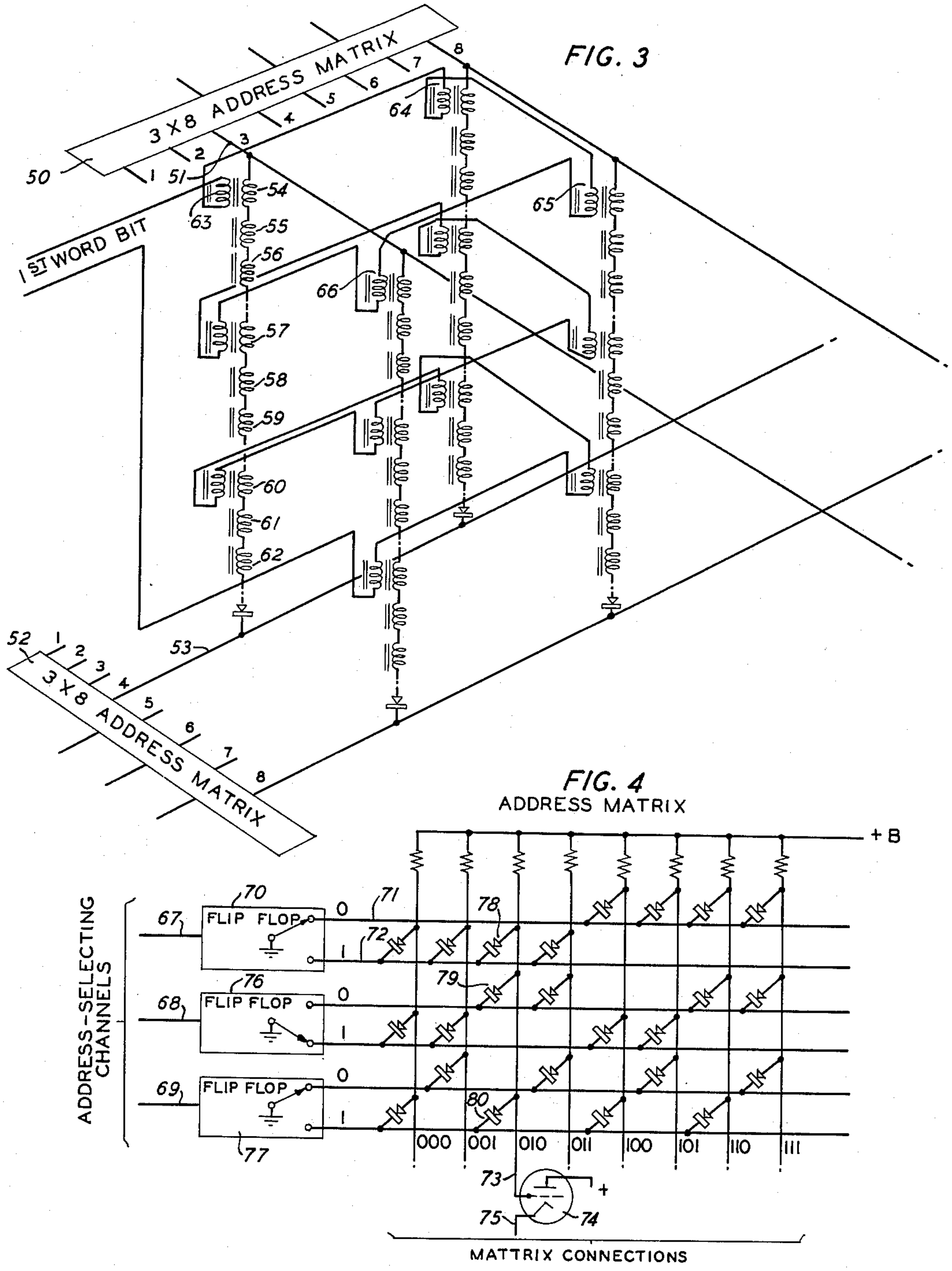
Fig. 3 is an isometric representation of a matrix through which a two dimensional plane may be selected.
Fig. 4 is a schematic circuit drawing showing the essential components of an address matrix.

It is believed that the matrix connections may best be appreciated by looking at Fig. 3, which depicts the connections for selecting a single plane such as that containing the coils 1 to 16 of Fig. 2. Here, by means of an address matrix 50, a particular matrix wire, 51, is selected. If, through another address matrix 52 another matrix wire 53 is selected, then a connection through coils 54 to 62 inclusive is established and this series connection represents one of the planes of Fig. 2. The group of coils 54, 55 and 56 represent one word line, the coils 57, 58 and 59 represent another word line, and the coils 60, 61 and 62 represent a third word line and all together represent a word line circuit. In a full sized system mentioned there may be 64 such word lines in each such connection between any given two matrix wires and since with eight matrix wires from each address matrix there will be 64 such connections there will be provision for 4096 word lines.

It may also be noted, at this time, that the coils 54, 55 and 56 representing one word line, may also represent the 40 word bits which may be employed for each word line. The series arrangement of coils 63, 64, 65, 66 and so forth represents the first word bit connection 4096 coils wound on the first word bit core of each of the word lines, shown here as associated with the first coil in each word line.

It will be seen from other figures that when the coil 54 is selected to energize its core by $H_1$ and the corresponding coil of the intersecting plane is selected to energize the same core by an additional $H_1$, that the total energization of the core will be $2H_1$ sufficient to cause a change of state and this will be carried out if the word bit coil 63 is left on open circuit. However, through bit selection, an inhibiting current may be carried by this coil 63 so that the total energization of the core is $+H_1+H_1-H_1=+H_1$ and a change in state is prevented.

Figure 6:
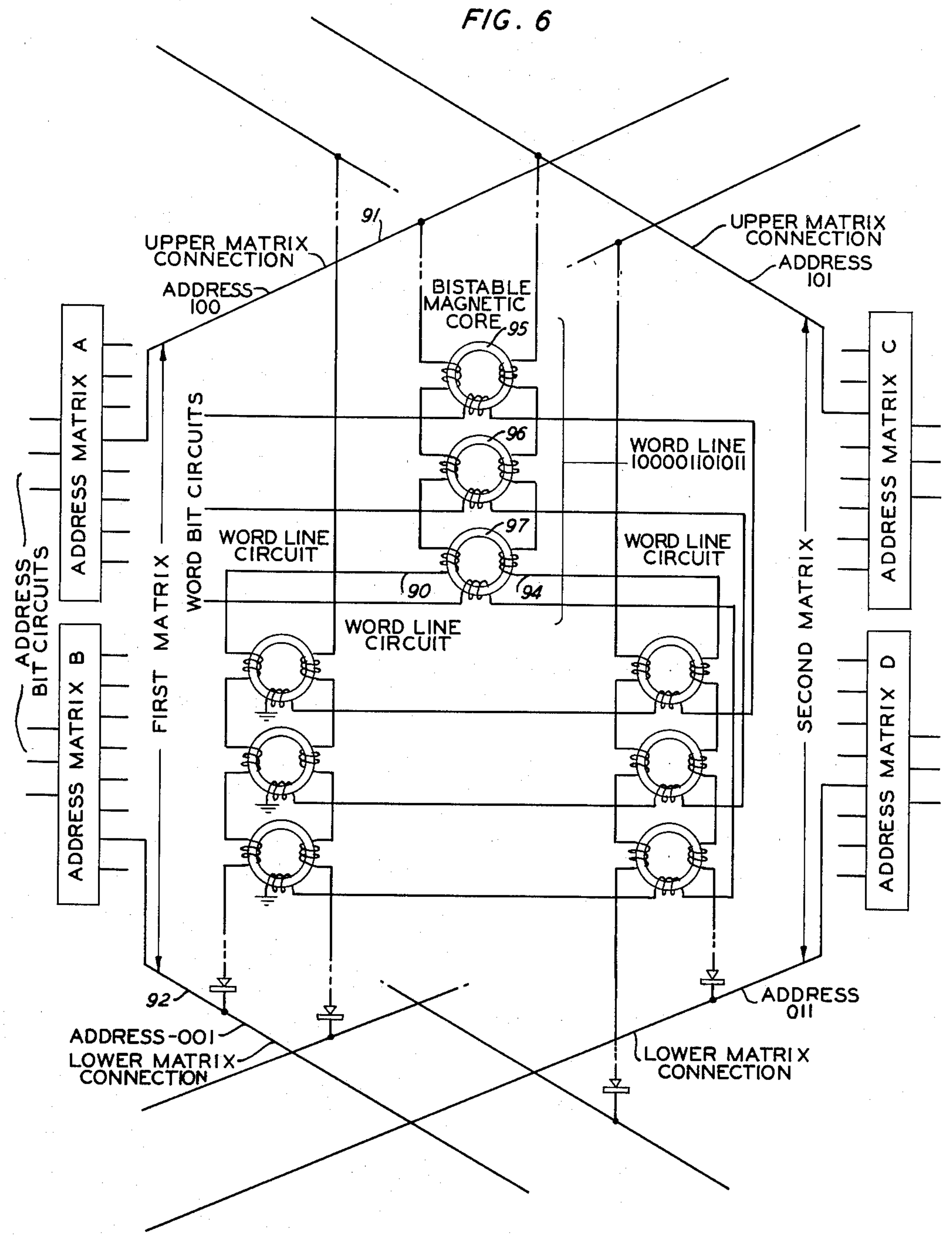
Fig. 6 is a schematic circuit diagram having the components labelled in order to clarify the meanings of terms employed and particularly to picture the selection of a unique word line.

The essential elements of a five dimensional system are depicted in Fig. 6. Here four address matrices, labelled Address Matrix A, Address Matrix B, Address Matrix C and Address Matrix D are shown. Each has three incoming Address Bit Circuits and eight outgoing matrix connections. Through the Address Matrix A an upper connection of a first matrix may be selected and through the Address Matrix B a lower matrix connection of this first matrix may be chosen so that a unique word line circuit 90 is enabled. If the address of the upper connection 91 is 100 (in binary notation) and the address of the lower connection 92 is 001 (in binary notation), then the address of the unique word line circuit 90 will be 100001. In like manner the unique word line circuit 94 may be enabled by another matrix reached through the Address Matrix C and the Address Matrix D whose address may 101011. Now it will be noted that in a single word line represented by the three cores 95, 96 and 97 are these two word line circuits associated with each other and in this manner the unique word line 100001101011 is selected.

It will be noted that the various word bit circuits each pass through corresponding coils in each word line, as shown also in Fig. 3.

The four dimensional system explained in more detail hereinafter by the use of Fig. 7 may be formed by elimination of one of the address matrices, say Address Matrix D and connecting all the (eight) wires thereof together to a common ground.

Fig. 4 is a representation of an address matrix. It is contemplated that information may be stored through the coincident transmission to the storage device of the present invention of a plurality of binary notation signals to represent the address as well as the word bits of the information to be stored. Merely by way of example, the matrix wire 51 is the third in a plurality of eight such wires and the matrix wire 53 is the fourth such wire in another plurality of eight. The address of the first (wire 51 in Fig. 3) may be the binary expression 010 and the address of the second (wire 53) may be the binary expression 011. Fig. 4 shows the full set of eight binary expressions which may be used to make a selection of one out of eight by a three place binary code. The three incoming wires 67, 68 and 69 represent the three channels over which the three binary expression bits of the address may be transmitted from any conventional source such as the control circuit of a large scale computer. The wire 67, by way of example, leads to the device 70 by which either the outgoing wire 71 is grounded for binary 0 or the outgoing wire 72 is grounded for binary 1. If the third wire 73 is to be selectively enabled, then the flip-flop 70 must be driven to binary 0, the flip-flop 76 must be driven to binary 1, and the flip-flop 77 must be driven to binary 0, so that the outgoing wire 73 will be the only one out of the eight to be free of a disabling ground since each of the diodes 78, 79 and 80 in this particular case leads to an open circuit whereby the tube 74 is enabled and the matrix wire 75 is rendered effective.

Thus, with a twelve place code channel the two intersecting X and Y planes of Fig. 2 may be selected so that one out of 4096 word lines may be enabled for the operation of writing in or for reading out of information. The four address matrices are each activated from three incoming channels and each has eight outgoing lines corresponding to the eight binary expressions possible in three places. It may be noted that for such a 3 by 8 matrix, but 24 diodes are necessary.

Fig. 2, it has been noted, represents a five dimensional arrangement including an X matrix for the coincident selection of the two ends of the network of coils representing each X plane and a like arrangement of a Y matrix for the coincident selection of the two ends of the network of coils representing each Y plane. The fifth dimension, so-called, resides in the means for word bit selection. Each plane, be it for driving the cores of a selected word line for a write operation or for clearing the cores in a read operation is provided with a diode to prevent sneak paths through the matrix.

Figures 5, 7:
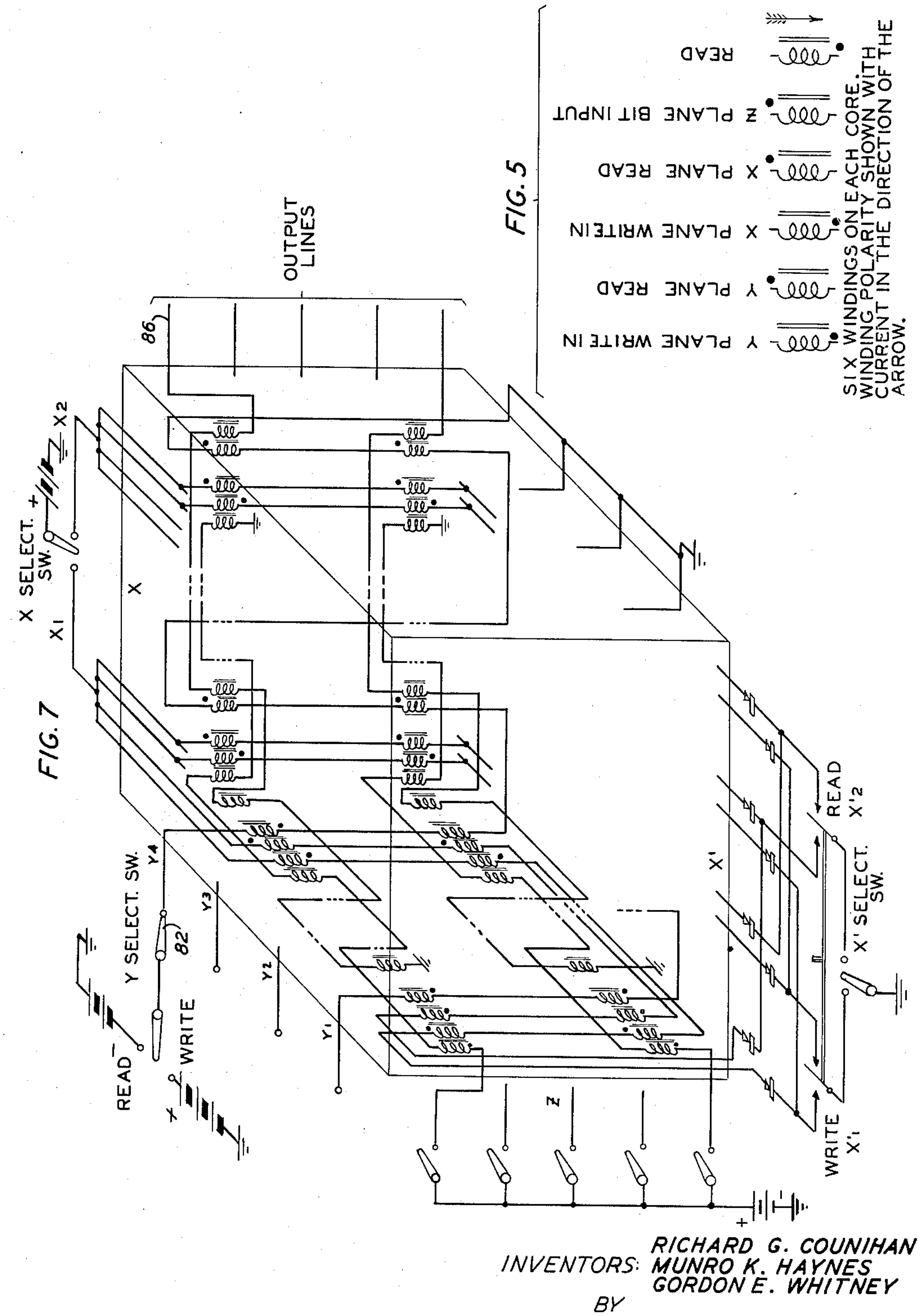
Fig. 5 is a representation of a magnetic core showing the six coils which may be wound thereon, in somewhat larger scale than in the drawings of Figs. 2 and 6.
Fig. 7 is a schematic circuit diagram similar to Fig. 2 showing a four dimensional write arrangement and a three dimensional read arrangement.

Fig. 5 is a representation of a core having six coils, a write and a read coil for the Y plane, a write and a read coil for the X plane, a Z plane word bit coil and a read coil in which a pulse is created in a core being driven on a read operation from binary 1 to binary 0 for transmission to some other circuit such as the arithmetic unit of a computer. The polarity of the winding is indicated by a dot at one end thereof.

Fig. 7 is an arrangement which may be termed a four dimensional write and a three dimensional read device. The selection of an X plane is the same as shown in Fig. 2 but the selection of a Y plane is direct, that is only one connection is made to the plane, the other ends of the word line circuits being each connected in parallel to a common ground. On an equal basis the capacity of this system is much smaller ($8\times8\times8=512$).

It may be noted in Fig. 2 that the $Z_n$ word bit circuit consists of a coil such as 84 and a diode such as 85 for each core all connected in multiple. Such an arrangement may be used where current of but a single direction is to be transmitted therethrough. In Fig. 3 and in Fig. 6 a purely series arrangement is shown. The choice between the multiple and the series arrangement is dictated by engineering requirements with which we are not concerned at present.

In Fig. 7, a series arrangement of output coils leading to the output lines, such as 86, is shown.

What is claimed is:

1. Apparatus for registering information magnetically by the transmission of electrical pulses, comprising, a plurality of bistable magnetic cores each having a plurality of coils interlinked therewith, a plurality of word lines, each consisting of a plurality of said cores equal in number to the number of bits in a word, a first matrix having a plurality of upper connections and a plurality of lower connections, a second like matrix, a plurality of word line circuits connected to each of said upper matrix connections of said first matrix, each said word line circuit connected to the same upper matrix connection being connected to a separate and different one of said lower matrix connections whereby a unique word line circuit may be selected by the selection of a particular upper and a particular lower said matrix connection, a like arrangement of word line circuits for said second matrix, coils for a plurality of word lines being included in each said word line circuit, each word line circuit of said first matrix being coupled through the cores of a single word line with a separate and different word line circuit of said second matrix whereby a unique word line may be selected by the coincident selection of a unique word line circuit in each of said two matrices.

2. Apparatus for registering information magnetically by the transmission of electrical pulses, comprising a plurality of bistable magnetic cores each having a plurality of coils interlinked therewith, a plurality of word lines, each consisting of a plurality of said cores equal in number to the number of bits in a word, a first matrix having a plurality of upper connections and a plurality of lower connections, a second matrix having a plurality of upper connections and a plurality of lower connections, a complete array of word line circuits each including the coils of a plurality of word lines, said word line circuits interconnecting each said upper matrix connection with each said lower matrix connection of each said matrix, there being connected between each said upper matrix connection of said first matrix and each said lower matrix connection of said first matrix a single word line circuit, like connections between said upper matrix connections and said lower matrix connections of said second matrix, each of said word line circuits of said first matrix having connected therein a number of first matrix word lines equal in number to the number of word line circuits of said second matrix, like connections for said word line circuits of said second matrix, each said word line of each said word line circuit of a given matrix including a separate and different word line circuit of the other of said matrices, and means for selecting a unique word line circuit from each said matrix whereby a unique word line may be selected by the coincident selection of a unique word line circuit in each of said two matrices.

References Cited in the file of this patent

UNITED STATES PATENTS

| | | |
|---|---|---|
| 2,446,643 | Farmer | Aug. 10, 1948 |
| 2,570,716 | Rochester | Oct. 9, 1951 |
| 2,614,176 | Dimond | Oct. 14, 1952 |

OTHER REFERENCES

"Magnetic Cores as Elements of Digital Computing Systems," a thesis by M. K. Haynes, pub. by the University of Illinois, received by the Library of the U. S. Pat. Office, May 12, 1952 (pgs. 24–28).

A publication entitled "Static Magnetic Matrix Memory and Switching Circuits," by J. A. Rajchman in RCA Review. June 1952 (pages 184–187).

Ed Vac Progress Report #2. June 30, 1946 (Figure 17B and pages 4–23 relied upon).

Digital Information Storage In Three Dimensions Using Magnetic Cores; Forrester, Journal of Applied Physics, vol. 22, No. 1; January 1951 (pages 45–47 relied upon).

Ferrites Speed Digital Computers; Brown and Albers-Schoenberg Electronics, McGraw-Hill publications; April 1953 (pages 146–148 relied upon).